US012459196B2

(12) United States Patent
Raeker et al.

(10) Patent No.: US 12,459,196 B2
(45) Date of Patent: Nov. 4, 2025

(54) PATTERNED FILAMENT FOR FUSED FILAMENT FABRICATION

(71) Applicants: Rolls-Royce Corporation, Indianapolis, IN (US); Rolls-Royce North American Technologies, Inc., Indianapolis, IN (US)

(72) Inventors: Evan Raeker, Ann Arbor, MI (US); Quinlan Yee Shuck, Indianapolis, IN (US); Scott Nelson, Carmel, IN (US); Raymond Ruiwen Xu, Carmel, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 216 days.

(21) Appl. No.: 17/096,112

(22) Filed: Nov. 12, 2020

(65) Prior Publication Data

US 2021/0146603 A1 May 20, 2021

Related U.S. Application Data

(60) Provisional application No. 62/935,380, filed on Nov. 14, 2019.

(51) Int. Cl.
*B29C 67/00* (2017.01)
*B29C 64/118* (2017.01)
(Continued)

(52) U.S. Cl.
CPC .......... *B29C 64/118* (2017.08); *B29C 64/393* (2017.08); *B33Y 10/00* (2014.12);
(Continued)

(58) Field of Classification Search
CPC ..... B29C 64/118; B29C 64/393; B29C 64/40; B33Y 10/00; B33Y 30/00; B33Y 50/00; B33Y 50/02; B33Y 70/10
See application file for complete search history.

(56) References Cited

U.S. PATENT DOCUMENTS

| 4,346,904 A | 8/1982 | Watkins, Jr. |
| 4,466,772 A | 8/1984 | Okapuu et al. |
| (Continued) | | |

FOREIGN PATENT DOCUMENTS

| CN | 103980681 A | 8/2014 |
| DE | 102016110337 A1 | 12/2017 |
| (Continued) | | |

OTHER PUBLICATIONS

U.S. Appl. No. 16/144,235, filed Sep. 27, 2018, by Sippel et al.

(Continued)

*Primary Examiner* — Ryan M Ochylski
(74) *Attorney, Agent, or Firm* — Shumaker & Sieffert, P.A.

(57) ABSTRACT

In general, techniques are described for a patterned filament for fused filament fabrication. An additive manufacturing system may include a substrate defining a major surface, a filament delivery device, and a computing device. The computing device may be configured to control the filament delivery device to deposit a filament on the substrate, the filament including a primary material and a first binder, where the primary material distributed in a pattern having a first cross sectional geometry that differs from a second cross sectional geometry of the filament, and the binder is configured to be substantially removed from the filament.

7 Claims, 4 Drawing Sheets

(51) Int. Cl.
  *B29C 64/393* (2017.01)
  *B33Y 10/00* (2015.01)
  *B33Y 30/00* (2015.01)
  *B33Y 50/02* (2015.01)
  *B33Y 70/10* (2020.01)

(52) U.S. Cl.
  CPC .............. *B33Y 30/00* (2014.12); *B33Y 50/02* (2014.12); *B33Y 70/10* (2020.01)

(56) References Cited

U.S. PATENT DOCUMENTS

| | | |
|---|---|---|
| 5,951,892 A | 9/1999 | Wolfla et al. |
| 6,102,656 A | 8/2000 | Nissley et al. |
| 6,203,021 B1 | 3/2001 | Wolfla et al. |
| 6,375,880 B1 | 4/2002 | Cooper et al. |
| 6,887,528 B2 | 5/2005 | Lau et al. |
| 7,445,685 B2 | 11/2008 | Deakin et al. |
| 7,686,570 B2 | 3/2010 | Allen |
| 7,686,990 B2 | 3/2010 | Gray |
| 8,501,840 B2 | 8/2013 | Kirby et al. |
| 8,852,720 B2 | 10/2014 | Bolcavage et al. |
| 9,249,680 B2 | 2/2016 | Lee et al. |
| 9,527,242 B2 | 12/2016 | Rodgers et al. |
| 9,598,972 B2 | 3/2017 | Strock |
| 9,713,912 B2 | 7/2017 | Lee |
| 9,797,263 B2 | 10/2017 | Varney et al. |
| 9,925,714 B2 | 3/2018 | Rodgers et al. |
| 10,132,185 B2 | 11/2018 | Gold |
| 10,189,204 B2 | 1/2019 | Fulop et al. |
| 10,190,435 B2 | 1/2019 | Lee et al. |
| 10,870,152 B2 | 12/2020 | Le Biez et al. |
| 2005/0003172 A1 | 1/2005 | Wheeler et al. |
| 2005/0173380 A1 | 8/2005 | Carbone |
| 2006/0110248 A1 | 5/2006 | Nelson et al. |
| 2008/0274336 A1 | 11/2008 | Merrill et al. |
| 2010/0003894 A1 | 1/2010 | Miller et al. |
| 2010/0320649 A1 | 12/2010 | Niebling |
| 2011/0016717 A1 | 1/2011 | Morrison et al. |
| 2011/0097538 A1 | 4/2011 | Bolcavage et al. |
| 2011/0103940 A1 | 5/2011 | Duval et al. |
| 2012/0107103 A1 | 5/2012 | Kojima et al. |
| 2013/0017072 A1 | 1/2013 | Ali et al. |
| 2014/0154088 A1 | 6/2014 | Etter et al. |
| 2014/0294652 A1 | 10/2014 | Morrison et al. |
| 2014/0367894 A1 | 12/2014 | Kramer et al. |
| 2015/0014885 A1 | 1/2015 | Hofmann et al. |
| 2015/0099087 A1 | 4/2015 | Reznar et al. |
| 2015/0102531 A1 | 4/2015 | El-Siblani et al. |
| 2015/0108095 A1 | 4/2015 | Kruer et al. |
| 2015/0354392 A1 | 12/2015 | Lipkin et al. |
| 2015/0354393 A1 | 12/2015 | Lipkin et al. |
| 2016/0024293 A1 | 1/2016 | Nestle et al. |
| 2016/0089720 A1 | 3/2016 | Kamakura et al. |
| 2016/0130969 A1 | 5/2016 | Gold |
| 2016/0236994 A1 | 8/2016 | Vetters et al. |
| 2016/0236995 A1 | 8/2016 | Lai et al. |
| 2016/0281267 A1* | 9/2016 | Wetzel ................ B29C 66/5241 |
| 2016/0305316 A1 | 10/2016 | Shomura et al. |
| 2016/0305319 A1 | 10/2016 | Baldiga et al. |
| 2016/0319688 A1 | 11/2016 | Vetters et al. |
| 2017/0052531 A1 | 2/2017 | Minardi et al. |
| 2017/0120528 A1 | 5/2017 | Tejada Palacios et al. |
| 2017/0165917 A1 | 6/2017 | Mckiel, Jr. |
| 2017/0209923 A1 | 7/2017 | Giovannetti et al. |
| 2017/0225394 A9 | 8/2017 | Rodgers et al. |
| 2017/0259497 A1 | 9/2017 | Prestayko et al. |
| 2017/0297098 A1 | 10/2017 | Myerberg et al. |
| 2017/0297099 A1 | 10/2017 | Gibson et al. |
| 2017/0355138 A1 | 12/2017 | Mark |
| 2017/0370241 A1 | 12/2017 | Tham et al. |
| 2018/0106154 A1 | 4/2018 | Baldwin et al. |
| 2018/0162013 A1* | 6/2018 | Fulop ................ C04B 35/6455 |
| 2018/0202076 A1* | 7/2018 | Van Der Schaaf ... C04B 35/634 |
| 2018/0243830 A1 | 8/2018 | Kottilingam et al. |
| 2018/0297272 A1 | 10/2018 | Preston et al. |
| 2018/0305266 A1 | 10/2018 | Gibson |
| 2018/0326525 A1 | 11/2018 | Ann et al. |
| 2018/0326660 A1 | 11/2018 | Gifford et al. |
| 2018/0370213 A1 | 12/2018 | Gold et al. |
| 2019/0032503 A1 | 1/2019 | Shi et al. |
| 2019/0070664 A1 | 3/2019 | Paniogue et al. |
| 2019/0070778 A1 | 3/2019 | Haid et al. |
| 2019/0093499 A1 | 3/2019 | Sippel et al. |
| 2019/0134971 A1 | 5/2019 | Nielson-Cole et al. |
| 2019/0224911 A1 | 7/2019 | Shuck et al. |
| 2019/0224912 A1 | 7/2019 | Shuck et al. |
| 2019/0344495 A1 | 11/2019 | Shuck et al. |
| 2019/0351485 A1 | 11/2019 | Shuck |
| 2019/0389090 A1 | 12/2019 | Roy-mayhew et al. |
| 2020/0076044 A1 | 3/2020 | Alvarez et al. |
| 2020/0114420 A1 | 4/2020 | Pu et al. |
| 2020/0189143 A1* | 6/2020 | Brandt .................. C04B 35/653 |
| 2020/0277871 A1 | 9/2020 | Shi et al. |
| 2020/0316684 A1 | 10/2020 | Shuck |
| 2020/0376743 A1 | 12/2020 | Jodet et al. |
| 2020/0391292 A1 | 12/2020 | Shuck et al. |
| 2020/0400033 A1 | 12/2020 | Jouy et al. |
| 2021/0060866 A1 | 3/2021 | Nation et al. |

FOREIGN PATENT DOCUMENTS

| | | |
|---|---|---|
| EP | 1108857 A2 | 6/2001 |
| EP | 1905860 A2 | 4/2008 |
| EP | 2354276 A1 | 8/2011 |
| EP | 3218160 A1 | 9/2017 |
| EP | 3276038 A1 | 1/2018 |
| WO | 2015/077536 A1 | 5/2015 |
| WO | 2015/130519 A1 | 9/2015 |
| WO | 2016/012486 A1 | 1/2016 |
| WO | 2016/077473 A1 | 5/2016 |
| WO | 2016/108154 A1 | 7/2016 |
| WO | 2016/125138 A3 | 8/2016 |
| WO | 2016/1251138 A2 | 8/2016 |
| WO | 2017/081160 A1 | 5/2017 |
| WO | 2017/180958 A2 | 10/2017 |
| WO | 2019/110936 A1 | 6/2019 |

OTHER PUBLICATIONS

Frick, "Additive Manufacturing Comes to Metal Foam," Materials, Machine Design, accessed from https://www.machinedesign.com/materials/article/21830512/additive-manufacturing-comes-to-metal-foam, Apr. 26, 2013, 13 pp.

Jakus, "Metallic Architectures from 3D-Printed Powder-Based Liquid Inks," Wiley Library, Advanced Functional Materials, Nov. 2015, 11 pp.

"Lightweight, Composite Metal Foam Stops Bullet," [Abstract only] Materials, Tech Briefs Media Group, retrieved from https://www.techbriefs.com/component/content/article/tb/tv/34642 on Nov. 4, 2019, 1 pp.

Shim et al., "Additive Manufacturing of Porous Metals Using Laser Melting of Ti6Al4V Powder With a Foaming Agent," IOP Publishing, Materials Research Express, vol. 5, Jul. 25, 2018, 10 pp.

"Abradable Coatings Increase Gas Turbine Engine Efficiency," AZO Materials, accessed from https://www.azom.com/article.aspx?ArticleID=739, Aug. 23, 2001, 7 pp.

Ross et al., "Compressor Seal Selection and Justification," Proceedings of the Thirty-Second Turbomachinery Symposium, 2003 (Applicant points out, in accordance with MPEP 609.04(a), that the year of publication, 2003, is sufficiently earlier than the effective U.S. filing date, so that the particular month of publication is not in issue.) pp. 167-178.

U.S. Appl. No. 17/096,227, filed Nov. 12, 2020, by Shuck et al.

Kietzman et al., "Layered Manufacturing Material Issues for SDM of Polymers and Ceramics," International Solid Freeform Fabrication Symposium, Jan. 1997, 9 pp.

Hobson, "Electroplating Copper and Silver Onto 3D Prints," Hackaday, accessed from https://hackaday.com/2015/01/12/electroplating-copper-and-silver-onto-3d-prints/, Jan. 12, 2015, 2 pp.

(56) References Cited

OTHER PUBLICATIONS

"3D Printing and Electroplating for Experimentation," Form Labs, accessed from https://formlabs.com/blog/combining-3D-printing-and-electroplating-for-replicable-experimentation/, Aug. 2, 2017, 4 pp.
"Metal Plating for Your 3D Printed Parts—A Practical Guide," AMFG, accessed from https://amfg.ai/2017/07/06/metal-plating-3d-printed-parts/, Jul. 6, 2017, 3 pp.
Wolff, "Conductive Thermoplastics for 3D Printing," SME Media, accessed from https://advancedmanufacturing.org/3d-printed-thermoplastics/, Feb. 9, 2017, 9 pp.
"FDM Best Practice: Embedding Hardware," Stratasys, 2014 (Applicant points out, in accordance with MPEP 609.04 (a), that the year of publication, 2014, is sufficiently earlier than the effective U.S. filing date, so that the particular month of publication is not in issue.) 6 pp.
Ota et al., "Application of 3D Printing for Smart Objects with Embedded Electronic Sensors and Systems," Advanced Materials Technologies, Mar. 2, 2016, 22 pp.
Crease, "MMF #4: Embedding Nuts in 3D Printed Parts for Hidden Fastener Strength," markforged.com/blog, Jul. 27, 2016, 18 pp.
Allen et al., "An Experimental Demonstration of Effective Curved Layer Fused Filament Fabrication Utilising a Parallel Deposition Robot," Additive Manufacturing, vol. 8, Oct. 2015, pp. 78-87.
Shafer et al., "Cleated Print Surface for Fused Deposition Modeling," Solid Freeform Fabrication 2016: Proceedings of the 26th Annual International Solid Freeform Fabrication Symposium, Jan. 2017, pp. 1359-1365.
"Amazing Six-Axis 3D Printer Shown," /blog/2013/10/10/amazing-six-axis-3D-printer-shown-html, Fabbaloo, Oct. 10, 2013, 5 pp.
Walter, "3D Printering: Non-Planar Layer FDM," Hackaday, Jul. 27, 2016, 12 pp.
Yuen, "Embedding Objects During 3D Printing to Add to New Functionalities," Biomicrofluidics, vol. 10, Issue 4, Jul. 13, 2016, 10 pp.

* cited by examiner

PATTERNED FILAMENT FOR FUSED FILAMENT FABRICATION

This application claims the benefit of U.S. Provisional Application Ser. No. 62/935,380, entitled "PATTERNED FILAMENT FOR FUSED FILAMENT FABRICATION" and filed on Nov. 14, 2019, the entire content of which is incorporated herein by reference.

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

In some examples, various aspects of the techniques described in this disclosure are directed to a method comprising: fused filament fabricating a fused filament fabricated component by delivering a filament including a primary material and a first binder, the primary material being distributed in a pattern having a first cross sectional geometry that differs from a second cross sectional geometry of the filament; and heating the fused filament fabricated component to sinter the primary material to form a sintered part.

In some examples, various aspects of the techniques described in this disclosure are directed to a filament for fused filament fabrication, the filament comprising: a primary material; and a first binder, the primary material distributed in a pattern having a first cross sectional geometry that differs from a second cross sectional geometry of the filament.

In some examples, various aspects of the techniques described in this disclosure are directed to a method comprising: forming a slug using at least a primary material and a first binder; and extruding the slug to form a filament in which the primary material is distributed in a pattern having a first cross sectional geometry that differs from a second cross sectional geometry of the filament.

In some examples, various aspects of the techniques described in this disclosure are directed to an additive manufacturing system comprising: a substrate defining a major surface; a filament delivery device; and a computing device configured to: control the filament delivery device to deposit a filament on the substrate, the filament including a primary material and a first binder, wherein the primary material distributed in a pattern having a first cross sectional geometry that differs from a second cross sectional geometry of the filament, and the binder is configured to be substantially removed from the filament.

The details of one or more examples are set forth in the accompanying drawings and the description below. Other features, objects, and advantages will be apparent from the description and drawings, and from the claims.

DETAILED DESCRIPTION

The disclosure generally describes techniques for forming components using fused filament fabrication (FFF). In the techniques of this disclosure, the filament used in the FFF process includes a primary material and a binder where the primary material is distributed in a pattern having a first cross-sectional shape that differs from a second cross-sectional shape of the filament. The binder may then be removed (e.g., using water or alcohol, heat, chemical leaching, etc.) leaving the primary material in the distributed pattern. As rows of primary material are sintered, a metal foam may be formed that has application in many different contexts, including abradable coatings, heat exchangers, support structures (particularly in high temperature environments, such as gas turbine engines), catalysts, filters, impact absorbers, vibration dampeners, fluid wicks, etc.

Additionally, or alternatively, a filament may include a first binder in a first cross-sectional region of the filament and the second binder in a second cross-sectional region of the filament. In some examples, the first cross-sectional region of the filament may correspond to the first cross-sectional shape in which the primary material is distributed. The second region may fill the remainder of the cross-section of the filament. The first and second binders may be configured to be removed using different materials or mechanisms. For example, the second binder may be sensitive to a chemical (such as an acid, water, or an alcohol) to which the first binder is substantially inert, or the second binder may be thermally degraded at a temperature at which the first binder is substantially stable. This may alloy the second binder to be removed in a first process while the second binder remains substantially intact. The first binder may be later removed, e.g., during sintering of the primary material, leaving the metal foam described above.

Figure 1:
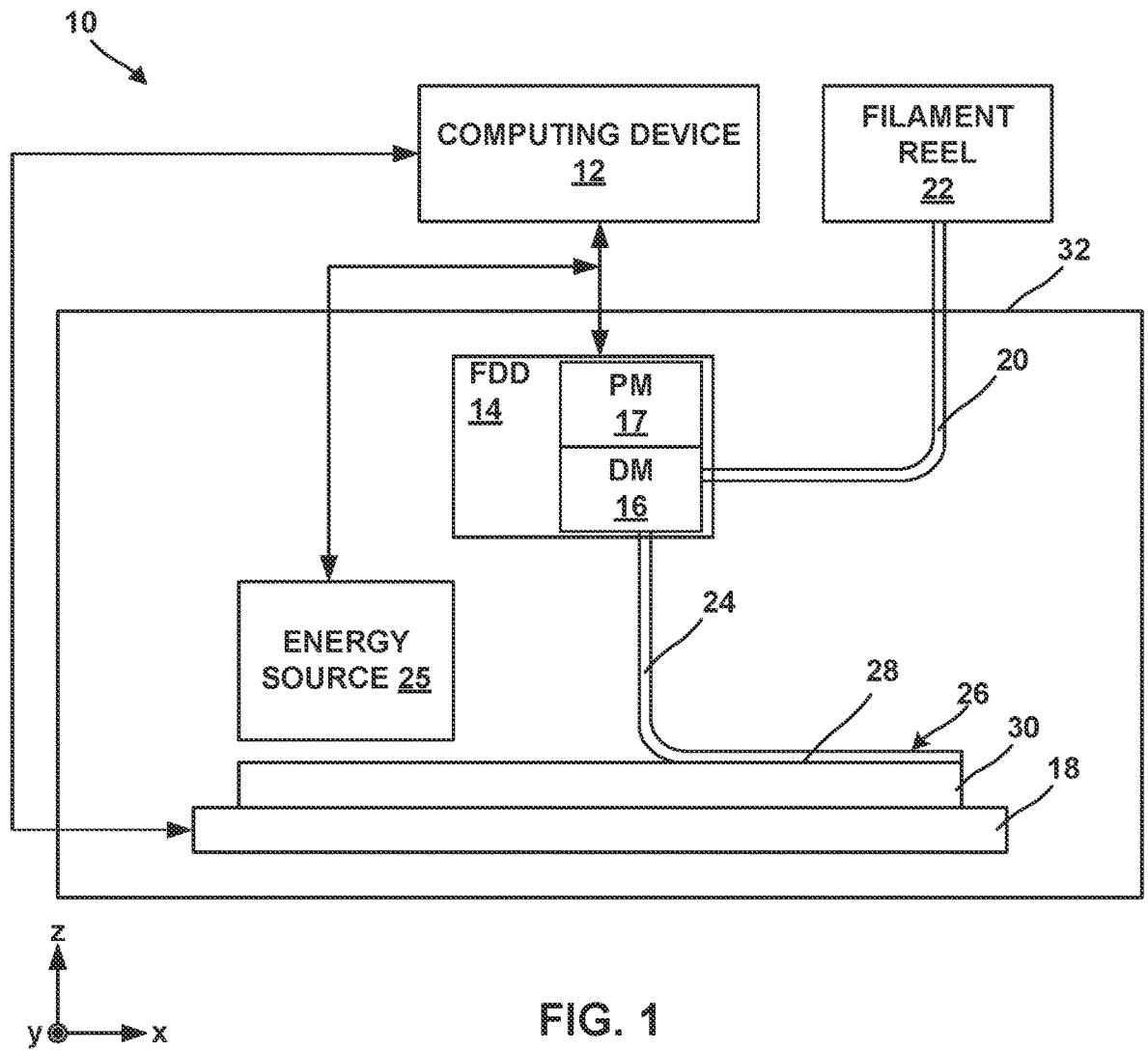
FIG. 1 is a conceptual block diagram illustrating an example system for forming an additively manufactured component by fused filament fabrication using a patterned filament.

FIG. 1 is a conceptual block diagram illustrating an example fused filament fabrication system 10 for performing fused filament fabrication to form an additively manufactured component using a patterned filament. Additive manufacturing system 10 may include computing device 12, filament delivery device 14, enclosure 32, and stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to above a softening or melting point of a component of filament 20 (e.g., a polymeric binder) to form a softened filament 24. Softened filament 24 is then extruded from delivery mechanism 16 and laid down in a road 26 on a major surface 28 of a substrate 30 (or, in subsequent layers, on a previously deposited road). The softened filament 34 cools and, in this way, is joined to other roads.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. In some examples, system 10 may not include a separate substrate 30, and filament delivery device 14 may deposit softened filament 24 on a build surface defined by stage 18, or on another component, or on layers of prior softened filament 24 or another material.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which roads 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of roads on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the primary material and/or binder.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition. Regardless of the number of filaments 20 and filament reels 22, each filament may include a primary material and a binder configured to bind the primary material in filament 20. The primary material may be in form of a powder, particles, whiskers, platelets, fibers, a braid, or the like.

The primary material may include any suitable ceramic, metal, alloy, or combinations thereof for forming an additively manufactured component. In some examples, the primary material include a high-performance metal or alloy for forming component used in mechanical systems, such as a steel (e.g., stainless steel) or other iron-based alloy, a nickel-based alloy, a cobalt-based alloy, a titanium-based alloy, or the like. In some examples, the primary material may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the primary material may include a polycrystalline nickel-based superalloy or a polycrystalline cobalt-based superalloy, such as an alloy including NiCrAlY or CoNiCrAlY.

For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, Wis. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich.

In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wi.

In some example, primary material may include a refractory metal or a refractory metal alloy, such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof.

In some examples, the primary material may include a ceramic, such as a nitride, carbide, or oxide, or carbon. Suitable ceramic materials include, for example, a silicon-containing ceramic, such as silica ($SiO_2$), silicon carbide (SiC), and/or silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples, the ceramic functions as a reinforcement material in a final component formed from the filament. The primary material thus may include continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like, within filament 20. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

In some examples, the primary material may include a metal or alloy and a ceramic. For example, the primary material may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders or particulates including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

Filament 20 also includes at least one binder. The at least one binder is configured to bind together the primary material (e.g., the powder, particles, whiskers, platelets, fibers, a continuous monofilament or multifilament two-dimensional or three-dimensional weave, braid, fabric, or the like) to form filament 20. The at least one binder may eventually be at least partially removed, e.g., by heating, dissolution, or chemical leaching prior to sintering and/or by heating during sintering to form a sintered component that includes the primary material.

In some examples, the at least one binder may include a polymer. Example polymers include polyvinyl alcohol (PVA), polyolefins (POs), polyacrylonitrile (PAN), polystyrene (PS), acrylonitrile butadiene styrene (ABS), polylactic acid (PLA), thermoplastic polyurethanes (TPOs), polyamides, furan resins, silicones, or the like, or combinations thereof.

Although there has been interest in creating metal foam structures in which voids or other cavities (either ordered or random) are created to reduce weight while retaining strength, producing such metal foams may be difficult and subject to certain limitations as a result of the way in which metal foams are produced. Current ways by which metal foams are produced may center on gases forming voids in a molten metal and then solidifying the melt to secure the voids in place. Such ways to produce metal foams are similar to a casting process and involves similar limitations to those known to the casting process, such as a poor surface finish (which may require surface finish operations), casting defects (including blow holes, scars, and scabs in addition to penetrations, cold shuts, mismatches, misruns, hot tears, shrinkages, buckles, pin holes, warpages, swells, etc.), lower fatigue strength compared to forging, and being potentially uneconomical for mass production.

In accordance with various aspects of the techniques described in this disclosure, FDD 14 may use a patterned filament 24 in which the primary material is distributed throughout the binder according to a cross-sectional pattern that may facilitate formation of a metal foam. The pattern may result in the primary material being distributed such that a cross-sectional geometry of the primary material is different than the cross-sectional geometry of filament 24. The pattern may be selected such that filament 24 may form a metal foam that does not suffer from the limitations of the casting process as a result of using the fused filament manufacturing process in which the primary material in the filament 24 is not melted, but only heated to sufficient temperatures to ensure bonding of the primary material.

Additionally, or alternatively, the at least one binder may include a first binder in which the primary material is dispersed and a second binder that acts as a sacrificial or support binder. A sacrificial or support binder is configured to be substantially fully removed prior to heating the fused filament fabricated component to sinter the primary material, thereby leaving voids or other cavities between the remainder of the filament that includes the primary material first binder and defining the structure of the metal foam that is formed after sintering. The voids or cavities may be ordered (e.g., tubes running in a single direction relative to one another) resulting in an ordered foam or unordered (e.g., in which the voids are random in both size and shape and directionality) resulting in a stochastic foam.

The sacrificial or support binder may include a polymer, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. In examples in which both the first binder (for the primary material) and the sacrificial or support binder include a polymer, the polymers may be different such that the sacrificial or support binder may be substantially fully removed (e.g., using heat or chemical removal) while leaving the binder intact. For example, the sacrificial or support binder may be selected to be removable using an alcohol or water, and as such the sacrificial or support binder may be alcohol or water soluble. The first binder may not be alcohol or water soluble, thus leaving the first binder substantially intact. As another example, the sacrificial or support binder may decompose at a temperature at which the binder is left substantially intact. In this way, the sacrificial or support binder may be removed prior to the heating the fused filament fabricated component to sinter the primary material. The primary material may be dispersed in the first binder according to the pattern.

The patterns may be adapted so as to change a volume fraction of each component (e.g., the powder plus first binder and the sacrificial or support binder) to change the resulting porosity of the foam. That is, for a less porous, denser metal foam, filament 24 may include larger amounts of the primary material compared to the sacrificial or support binder. For a more porous, less dense metal foam (relatively to the less porous, denser metal foam), filament 24 may include smaller amounts of the primary material compared to the sacrificial or support binder. The sacrificial or support binder may be substantially free, in terms of composition, of the primary material, such as only including, as one example, 5 volume percent or less of the primary material.

Figure 2:
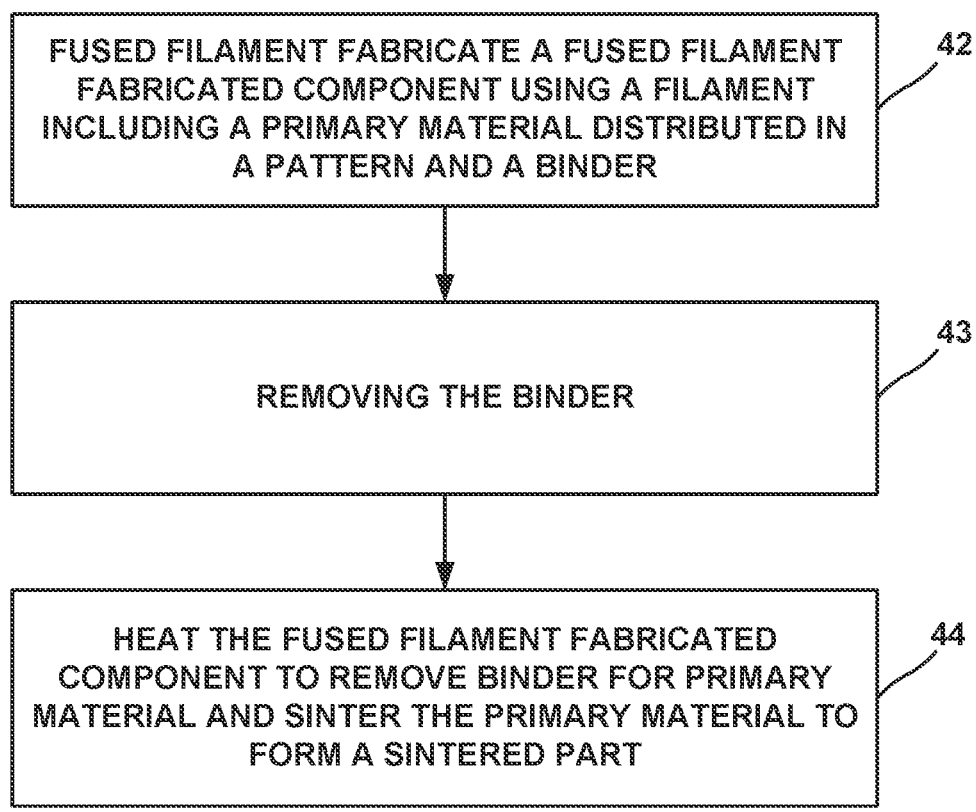
FIG. 2 is a flow diagram illustrating an example technique for forming a fused filament fabricated component using a patterned filament.

An example technique that may be implemented by system 10 will be described with concurrent reference to FIG. 2. FIG. 2 is a flow diagram illustrating an example technique for forming a fused filament fabricated component using a patterned filament. Although the technique of FIG. 2 is described with respect to system 10 of FIG. 1, in other examples, the technique of FIG. 2 may be performed by other systems, such a system including fewer or more components than those illustrated in FIG. 1. Similarly, system 10 may be used to performed other additive manufacturing techniques.

The technique of FIG. 2 includes fused filament fabricating a fused filament fabricated component that includes a primary material distributed in a cross-sectional pattern and a binder (42). Fused filament fabricating the fused filament fabricated component (42) may include positioning substrate 30 including surface 28 adjacent to a build position, e.g., on stage 18. In some examples, system 10 may not include a separate substrate 30, and the technique of FIG. 2 may include positioning a build surface defined by stage 18, or by another component, or layers of prior softened filament 24 or another material.

Fused filament fabricating the fused filament fabricated component (42) also may include forming a road 26 of material using fused filament fabrication. Computing device 12 may cause filament delivery device 14 to deposit softened filament 24 in one or more roads 26 to ultimately form the fused filament fabricated component. A plurality of roads 26 defining a common plane may define a layer of material. Thus, successive roads 26 may define a series of layers, for example, parallel layers, and the series of layers may eventually define the additively manufactured component.

Fused filament fabricating the fused filament fabricated component (42) additionally may include forming, on roads 26 of material, at least one additional layer of material to form the fused filament fabricated component. For example, computing device 12 may control movement and positioning of filament delivery device 14 relative to stage 18, and vice versa, to control the locations at which roads 26 are formed. Computing device 12 may control movement of filament delivery device 14, stage 18, or both, based on a computer aided manufacturing or computer aided design (CAM/CAD) file.

For example, computing device 12 may control filament delivery device 14 to trace a pattern or shape to form a layer including a plurality of roads 26 on surface 28. Computing device 12 may control filament delivery device 14 or stage 18 to move substrate 30 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines a fused filament fabricated component (42).

The technique of FIG. 2 includes removing the sacrificial binder (which may also be referred to as a support binder) (43). As noted above, removing the sacrificial binder may involve applying water or alcohol or heat to the sacrificial binder. After removing the sacrificial binder (43), heating the fused filament fabricated component to remove binder of the primary material and sinter the primary material to form a sintered part (44). For example, the fused filament fabricated component may be placed in a furnace to heat the fused filament fabricated component and cause sintering of the primary material (44).

Sintering may promote the bonding of the primary material in each road 26 to each other road 26 to strengthen the component. Sintering may not melt the primary material, thus leaving the microstructure of the primary material substantially intact. This may facilitate forming components with selected microstructures compared to techniques that include melting the primary material, such as casting. Sintering may also densify an interior and/or a surface region of the component, for example, by promoting compaction and reducing porosity.

FIGS. 3A-3D are diagrams illustrating various cross sectional views of the patterned filament. Referring first to the example of FIG. 3A, a cross section 48A of a patterned filament (e.g., filament 24) may include a first domain 50 that include a first binder and primary material and second domains 52A-52D that include a sacrificial or support binder. Cross section 48A shows first domain 50 distributed in a cross shape pattern surrounded by second domains 52A-52D. Second domains 52A-52D may be substantially free of primary material. As noted above, the sacrificial or support binder in second domains 52A-52D may comprise a polymer that is configured to be remove using a first process or mechanism (e.g., the sacrificial or support binder may be water or alcohol soluble), where the first binder of first domain 50 may be left substantially intact after the first process or mechanism (e.g., first domain 50 may comprise a polymer that is not water or alcohol soluble).

For the cross-shape pattern, the ends to the left and right of first domain 50 may bond with adjacent rows 26. The top and bottom of first domain 50 may bond with different layers of rows 26. In this way, one or more uniform channels may be formed, creating a uniform foam (e.g., either a metal or alloy foam or a ceramic foam).

Figure 3A:
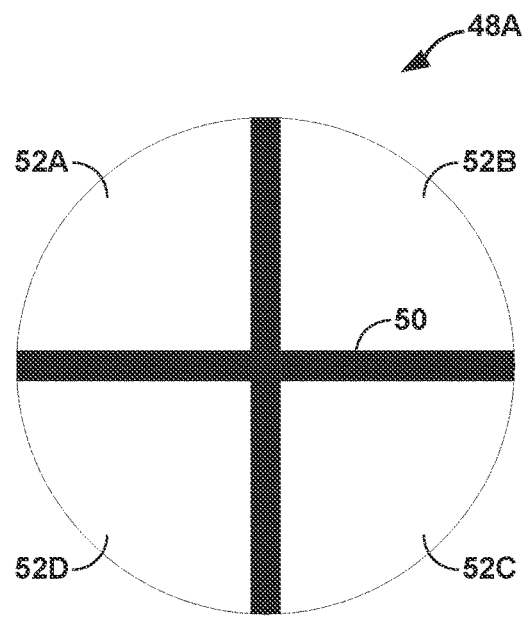
FIGS. 3A-3D are diagrams illustrating various cross-sectional views of the patterned filament.

As illustrated in the example of FIG. 3A, the cross-sectional geometry of the filament differs with the cross sectional geometry of the pattern in which the primary materials are distributed. In the example of FIG. 3A, the pattern of first domain 50 in which the primary material is dispersed is a cross shape, while the pattern of the filament is a circle. As such, the cross-sectional geometry of the pattern in which primary material is distributed differs from the cross-sectional geometry of the filament.

Figure 3B:
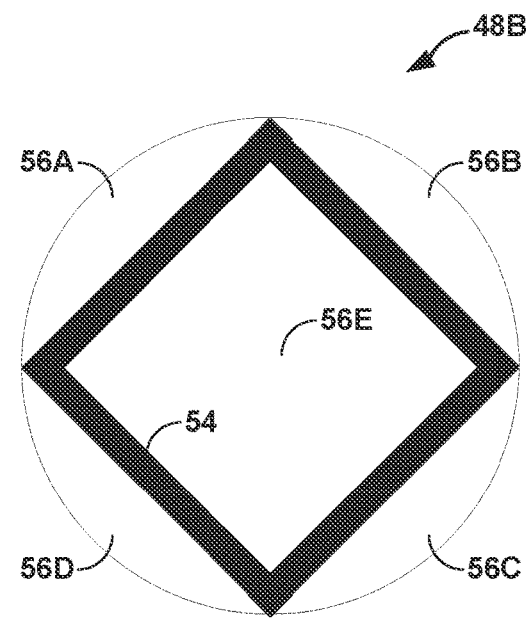

Referring next to the example of FIG. 3B, a cross section 48B of a patterned filament (e.g., filament 24) may include a first domain 54 that includes a primary material and a first binder and second domains 56A-56E that include a sacrificial or support binder. Cross section 48B shows first domain 54 distributed in a regular polygon pattern surrounded by second domains 56A-56E. Second domains 56A-56E may include sacrificial binder and may be substantially free from primary material, while first domains 54 may include powder (e.g., metal powder, alloy powder, ceramic powder, or some combination thereof) and binder. As noted above, the sacrificial or support binder of second domains 56A-56E may comprise a polymer that is configured to be removed using a first process or mechanism (e.g., the sacrificial or support binder may be water or alcohol soluble), where the first binder of first domain 54 may comprise a polymer that is left substantially intact after the first process or mechanism (e.g., first domain 50 may include a polymer not water or alcohol soluble).

For the regular polygon pattern, the end to the left and right of first domain 54 may bond with adjacent rows 26. The top and bottom of first domain 54 may bond with different layers of rows 26. In this way, one or more uniform channels may be formed, creating a uniform foam (e.g., either a metal or alloy foam or a ceramic foam).

As illustrated in the example of FIG. 3B, the cross-sectional geometry of the filament differs with the cross-sectional geometry of the pattern in which the primary material is distributed. In the example of FIG. 3B, the pattern of first domain 54, which includes the primary material, is a regular polygon, while the pattern of the filament is a circle. As such, the cross-sectional geometry of the pattern in which the primary material is distributed differs from the cross-sectional geometry of the filament.

Figure 3C:
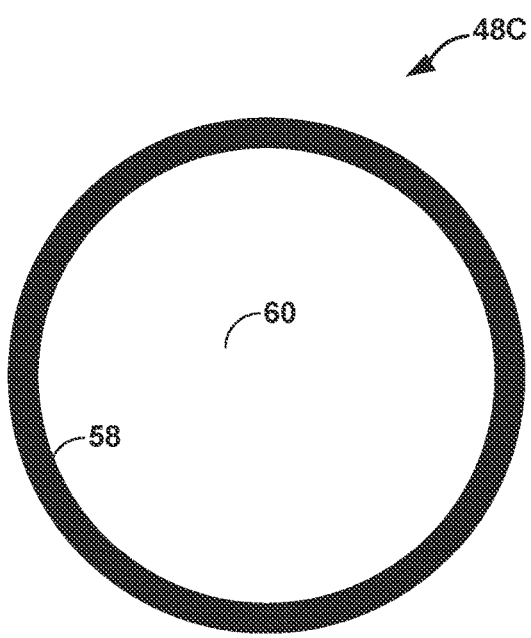

Referring to the example of FIG. 3C, a cross section 48C of a patterned filament (e.g., filament 24) may include a first domain 58 including a first binder and a primary material and a second domain 60 that includes a sacrificial or support binder. Second domain 60 may be substantially free from primary material. Cross section 48C shows first domain 58 distributed in a ring shape pattern supported by second domain 60. As noted above, sacrificial or support binder 60 may comprise a polymer that is configured to be removed using a first process or mechanism (e.g., the sacrificial or support binder may be water or alcohol soluble), where the first binder of primary material 58 may comprise a polymer that is left substantially intact after the first process or mechanism (e.g., first domain 50 may include a polymer that is not water or alcohol soluble).

For the ring shape pattern, the surfaces to the left and right of first domain 58 may bond with adjacent rows 26. The surfaces to the top and bottom of first domain 58 may bond with different layers of rows 26. In this way, one or more uniform channels may be formed, creating a uniform foam (e.g., either a metal or alloy foam or a ceramic foam).

As illustrated in the example of FIG. 3C, the cross-sectional geometry of the filament differs with the cross-sectional geometry of the pattern in which the primary materials are distributed. In the example of FIG. 3C, the pattern of first domain 58, which includes the primary material, is a ring or annulus shape, while the pattern of the filament is a continuous circle. As such, the cross-sectional geometry of the pattern in which the primary material (in first domain 58) is distributed differs from the cross-sectional geometry of the filament.

Figure 3D:
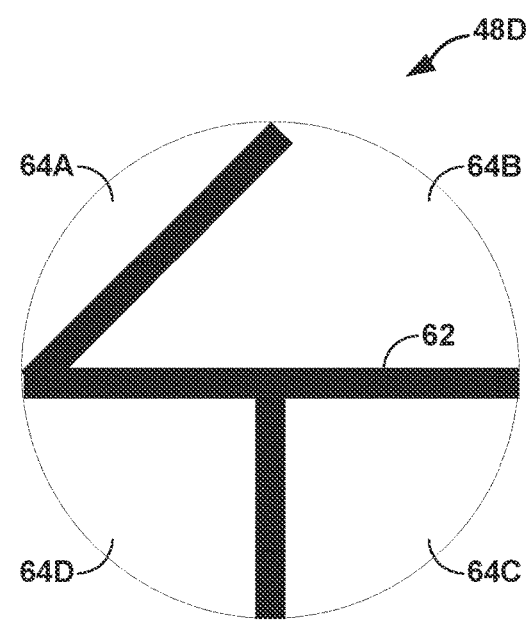

Referring to the example of FIG. 3D, a cross-section 48D of a patterned filament (e.g., filament 24) may include a first domain 62 that includes a primary material and a binder and second domains 64A-64D that include a sacrificial or support binder. Second domains 64A-64D may be substantially free from primary material. Cross-section 48D shows primary material disposed in first domain 62 distributed in an irregular pattern surrounded by second domains 64A-64D. As noted above, second domains 64A-64D may comprise a polymer that is configured to be removed using a first process or mechanism (e.g., the sacrificial or support binder may be water or alcohol soluble), where binder of primary material 62 may comprise a polymer that is left substantially intact after the first process or mechanism (e.g., first domain 50 may include a polymer that is not water or alcohol soluble).

For the irregular pattern, the end to the left and right of first domain 62 may bond with adjacent rows 26. The top and bottom of first domain 62 may bond with different layers of rows 26. In this way, one or more uniform channels of irregular shapes may be formed, creating a semi-uniform foam (e.g., either a metal or alloy foam or a ceramic foam).

As illustrated in the example of FIG. 3D, the cross-sectional geometry of the filament differs with the cross sectional geometry of the pattern in which the primary materials are distributed (e.g., the pattern of first domain 62). In the example of FIG. 3D, the pattern of first domain 62 is an irregular pattern, while the pattern of the filament is a continuous circle. As such, the cross-sectional geometry of the pattern in which the primary material is distributed differs from the cross-sectional geometry of the filament.

Although the cross-sectional geometry of the filament is shown as being a circle in the examples shown in FIGS. 3A-3D, the cross sectional geometry of the filament may be any particular geometry. Examples of other cross-sectional geometries for the filament include a square, a rectangle, or any other regular or irregular polygon (including a triangle), an oval, or any other geometry.

Figure 4:
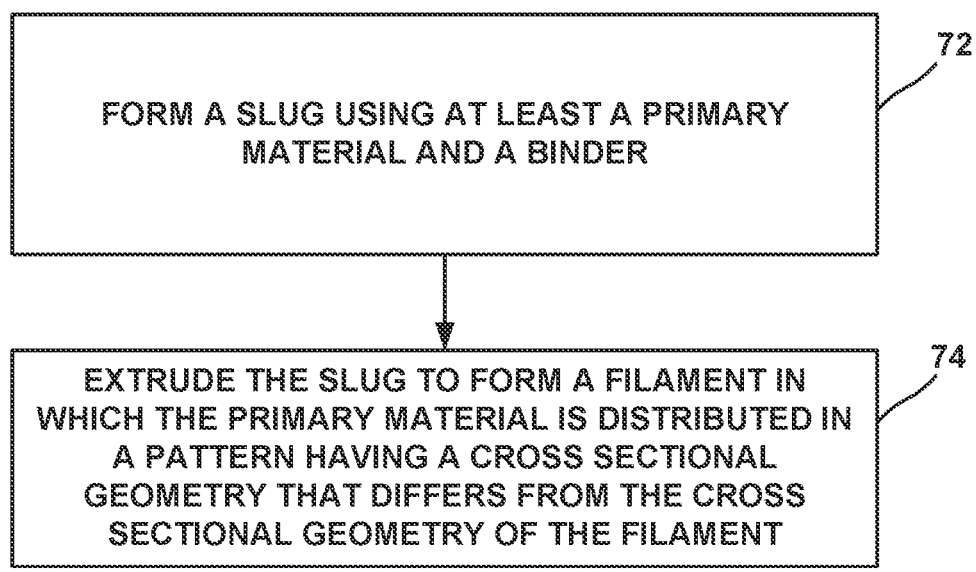
FIG. 4 is a flow diagram illustrating an example process for manufacturing a patterned filament.

FIG. 4 is a flow diagram illustrating example process for manufacturing a patterned filament. The process of FIG. 4 includes forming a slug using at least a first material mixture including a primary material and a first binder and a second material including a sacrificial or support binder (72). The slug may have the first material mixture including the primary material distributed according to any of the foregoing patterns described herein. An extrusion device may then extrude the slug to form a filament in which the primary material is distributed in a pattern having a cross-sectional geometry that differs form the cross-sectional geometry of the filament (74). The extrusion device may include a die having a slot in the cross-sectional geometric shape of the filament and a plunger that pushes the slug through the slot in the die to thereby extrude the filament from the slug.

Various aspects of the techniques may, in this respect, enable the following clauses:

Clause 1. A method comprising: fused filament fabricating a fused filament fabricated component by delivering a filament including a primary material and a first binder, the primary material being distributed in a pattern having a first cross sectional geometry that differs from a second cross sectional geometry of the filament; and heating the fused filament fabricated component to sinter the primary material to form a sintered part.

Clause 2. The method of clause 1, wherein the primary material comprises a powder, the powder including a metal or an alloy.

Clause 3. The method of any combination of clauses 1 and 2, wherein the primary material comprises a ceramic.

Clause 4. The method of any combination of clauses 1-3, wherein the primary material comprises a second binder.

Clause 5. The method of clause 4, wherein the second binder comprises a second polymer.

Clause 6. The method of clause 5, wherein the second polymer is not water soluble or alcohol soluble.

Clause 7. The method of any combination of clauses 1-6, wherein the first binder is substantially free of the primary material.

Clause 8. The method of clause 7, wherein the first binder comprises a first polymer that is water soluble or alcohol soluble.

Clause 9. The method of any combination of clauses 1-8, wherein the pattern comprises a regular polygon.

Clause 10. The method of any combination of clauses 1-8, wherein the pattern comprises a cross shape.

Clause 11. The method of any combination of clauses 1-8, wherein the pattern comprises a ring shape.

Clause 12. The method of any combination of clauses 1-8, wherein the pattern comprises an irregular pattern.

Clause 13. The method of any combination of clauses 1-12, wherein heating the fused filament fabricated component comprises heading the fused filament fabrication component to sinter the primary material to form a metal foam sintered part.

Clause 14. A filament for fused filament fabrication, the filament comprising: a primary material; and a first binder, the primary material distributed in a pattern having a first cross sectional geometry that differs from a second cross sectional geometry of the filament.

Clause 15. The filament of clause 14, wherein the primary material comprises a powder, the powder including a metal or an alloy.

Clause 16. The filament of any combination of clauses 14 and 15, wherein the primary material comprises a ceramic.

Clause 17. The filament of any combination of clauses 14-16, wherein the primary material comprises a second binder.

Clause 18. The filament of clause 18, wherein the second binder comprises a second polymer.

Clause 19. The filament of clause 18, wherein the second polymer is not water soluble or alcohol soluble.

Clause 20. The filament of any combination of clauses 14-19, wherein the first binder is substantially free of the primary material.

Clause 21. The filament of any combination of clauses 14-20, wherein the first binder comprises a first polymer that is water soluble or alcohol soluble.

Clause 22. The filament of any combination of clauses 14-21, wherein the pattern comprises a regular polygon.

Clause 23. The filament of any combination of clauses 14-22, wherein the pattern comprises a cross shape.

Clause 24. The filament of any combination of clauses 14-22, wherein the pattern comprises a ring shape.

Clause 25. The filament of any combination of clauses 14-22, wherein the pattern comprises an irregular pattern.

Clause 26. A method comprising: forming a slug using at least a primary material and a first binder; and extruding the slug to form a filament in which the primary material is distributed in a pattern having a first cross sectional geometry that differs from a second cross sectional geometry of the filament.

Clause 27. The method of clause 26, wherein the primary material comprises a powder, the powder including a metal or an alloy.

Clause 28. The method of any combination of clauses 26 and 27, wherein the primary material comprises a ceramic.

Clause 29. The method of any combination of clauses 26-28, wherein the primary material comprises a second binder.

Clause 30. The method of clause 29, wherein the second binder comprises a second polymer.

Clause 31. The method of clause 30, wherein the second polymer is not water soluble or alcohol soluble.

Clause 32. The method of any combination of clauses 26-31, wherein the first binder is substantially free of the primary material.

Clause 33. The method of any combination of clauses 26-32, wherein the first binder is water soluble or alcohol soluble.

Clause 34. The method of any combination of clauses 26-33, wherein the pattern comprises a regular polygon.

Clause 35. The method of any combination of clauses 26-33, wherein the pattern comprises a cross shape.

Clause 36. The method of any combination of clauses 26-33, wherein the pattern comprises a ring shape.

Clause 37. The method of any combination of clauses 26-33, wherein the pattern comprises an irregular pattern.

Clause 38. An additive manufacturing system comprising: a substrate defining a major surface; a filament delivery device; and a computing device configured to: control the filament delivery device to deposit a filament on the substrate, the filament including a primary material and a first binder, wherein the primary material distributed in a pattern having a first cross sectional geometry that differs from a second cross sectional geometry of the filament, and the binder is configured to be substantially removed from the filament.

Clause 39. The additive manufacturing system of clause 38, wherein the primary material comprises a powder, the powder including a metal or an alloy.

Clause 40. The additive manufacturing system of any combination of clauses 38 and 39, wherein the primary material comprises a ceramic.

Clause 41. The additive manufacturing system of any combination of clauses 38-40, wherein the primary material comprises a second binder.

Clause 42. The additive manufacturing system of clause 42, wherein the second binder comprises a second polymer.

Clause 43. The additive manufacturing system of clause 42, wherein the second polymer is not water soluble or alcohol soluble.

Clause 44. The additive manufacturing system of any combination of clauses 38-43, wherein the first binder is substantially free of the primary material.

Clause 45. The additive manufacturing system of any combination of clauses 38-44, wherein the first binder comprises a first polymer that is water soluble or alcohol soluble.

Clause 46. The additive manufacturing system of any combination of clauses 38-45, wherein the pattern comprises a regular polygon.

Clause 47. The additive manufacturing system of any combination of clauses 38-46, wherein the pattern comprises a cross shape.

Clause 48. The additive manufacturing system of any combination of clauses 38-46, wherein the pattern comprises a ring shape.

Clause 49. The additive manufacturing system of any combination of clauses 38-46, wherein the pattern comprises an irregular pattern.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
fused filament fabricating a fused filament fabricated component by delivering a filament including a primary material and a sacrificial first binder, wherein the primary material is distributed in a pattern having a first cross sectional geometry that differs from a second cross sectional geometry defined by the filament, the sacrificial first binder supporting the distribution of the primary material in the pattern having the first cross sectional geometry that differs from the second sectional geometry of the filament, wherein:
the sacrificial first binder comprises a first polymer that is soluble in a solvent that is an alcohol,
the primary material comprises a second binder that comprises a second polymer, and
the second polymer is not soluble in the solvent;
substantially removing, via the solvent, the sacrificial first binder, wherein the removed sacrificial first binder is substantially free of the primary material; and
heating, after substantially removing the sacrificial first binder, the fused filament fabricated component to sinter, at temperatures that avoid melting the filament, the primary material to form a sintered part comprising a metal foam, an alloy foam, or a ceramic foam having cavities.

2. The method of claim 1, wherein the primary material comprises a powder, the powder including a metal or an alloy.

3. The method of claim 1, wherein the primary material comprises a ceramic powder.

4. The method of claim 1, wherein the pattern comprises a regular polygon.

5. The method of claim 2, wherein the metal or the alloy includes an alloy that includes 9 to 10.0 wt. % W, 9 to 10.0 wt. % Co, 8 to 8.5 wt. % Cr, 5.4 to 5.7wt. % Al, about 3.0 wt. % Ta, about 1.0 wt. % Ti, about 0.7 wt. % Mo, about 0.5 wt. % Fe, about 0.015 wt. % B, and balance Ni.

6. The method of claim 3, wherein the ceramic powder includes silicon carbide (SiC).

7. The method of claim 1, wherein the first polymer comprises polystyrene (PS).

* * * * *